United States Patent
Doloff

(10) Patent No.: US 10,505,925 B1
(45) Date of Patent: Dec. 10, 2019

(54) MULTI-LAYER AUTHENTICATION

(71) Applicant: Amazon Technologies, Inc., Reno, NV (US)

(72) Inventor: Dustin Doloff, Seattle, WA (US)

(73) Assignee: Amazon Technologies, Inc., Seattle, CA (US)

( * ) Notice: Subject to any disclaimer, the term of this patent is extended or adjusted under 35 U.S.C. 154(b) by 65 days.

(21) Appl. No.: 15/697,056

(22) Filed: Sep. 6, 2017

(51) Int. Cl.
*H04L 29/06* (2006.01)

(52) U.S. Cl.
CPC ........ *H04L 63/083* (2013.01); *H04L 63/0272* (2013.01); *H04L 63/0853* (2013.01); *H04L 63/101* (2013.01); *H04L 63/107* (2013.01)

(58) Field of Classification Search
CPC . H04L 63/083; H04L 63/0853; H04L 63/101; H04L 63/0272; H04L 63/107
See application file for complete search history.

(56) References Cited

U.S. PATENT DOCUMENTS

| 6,892,307 | B1 * | 5/2005 | Wood | G06F 21/41 713/155 |
|---|---|---|---|---|
| 9,118,656 | B2 * | 8/2015 | Ting | H04L 63/104 |
| 9,148,414 | B1 * | 9/2015 | Roth | H04L 63/08 |
| 2004/0093519 | A1 * | 5/2004 | Grobman | H04L 9/3213 726/5 |
| 2007/0234408 | A1 * | 10/2007 | Burch | G06F 21/31 726/6 |
| 2011/0010542 | A1 * | 1/2011 | Choi | H04L 9/3213 713/168 |
| 2011/0209200 | A2 * | 8/2011 | Mr White | G06F 21/32 726/4 |
| 2012/0311671 | A1 * | 12/2012 | Wood | H04L 63/08 726/4 |
| 2013/0191906 | A1 * | 7/2013 | Park | H04W 12/06 726/15 |
| 2016/0259936 | A1 * | 9/2016 | Mukherjee | G06F 21/45 |
| 2018/0367526 | A1 * | 12/2018 | Huang | G06F 9/5072 |

* cited by examiner

*Primary Examiner* — Abu S Sholeman
(74) *Attorney, Agent, or Firm* — Hogan Lovells US LLP

(57) ABSTRACT

A layered authentication process can use a first authentication layer to filter out invalid requests. The first layer can perform a lightweight authentication to determine requests that do not meet certain authentication criteria. This can include, for example, denying requests that have invalid credentials or that are received from unapproved locations or sources, or that lack the proper format. Requests that pass the initial authentication can be directed to a more robust authentication service that is capable for performing a full authentication of the request. Such an approach prevents various invalid requests from being delivered to the robust authentication service, thereby preventing the robust authentication service from being overwhelmed by a large number of requests, such as may correspond to a coordinated attack on the service.

20 Claims, 5 Drawing Sheets

MULTI-LAYER AUTHENTICATION

BACKGROUND

Users are increasingly performing tasks using remote computing resources, often referred to as part of "the cloud." This has many advantages, as the resources will typically be purchased, managed, and configured by a resource provider. In situations such as a virtual private network (VPN), users can take advantage of these resources as if the users were directly connected to the network. In order to provide such access from across a public network, however, robust authentication mechanisms are typically used to ensure that only authorized users are permitted to access the resources via VPN. These robust mechanisms can be very resource intensive and can take a significant amount of time to process incoming requests. This exposes a potential vulnerability, as an attacker may be able to overwhelm the authentication mechanism and prevent legitimate users of the network from being authenticated to gain or maintain access.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to managing access to resources and content in an electronic environment. In particular, various approaches provide for a layered authentication process that uses an initial layer to filter out invalid requests to prevent overwhelming the authentication service. In some embodiments, a request that requires authentication can have information forwarded to an external service, such as may be accessible over a public network from which the request was received. The external service can perform at least a first, lightweight authentication, such as to filter out any requests that do not meet various authentication criteria. This can include, for example, denying requests with invalid credentials or that are received from unapproved locations or sources, among other such options. For requests that pass the external authentication, those requests can be directed to an internal authentication service, or other more robust authentication service, that is capable of performing a full authentication (and authorization, in at least some embodiments) of the request to enable access to the targeted resources. Such an approach enables many invalid requests to be denied by the external service such that those requests are never received to the internal service, thereby preventing the internal service from being overwhelmed when performing lengthy authentication checks for received requests. Such an approach can also help to thwart attackers who try to overwhelm the system in order to prevent valid users from being able to access the targeted resources.

Various other such functions can be used as well within the scope of the various embodiments as would be apparent to one of ordinary skill in the art in light of the teachings and suggestions contained herein.

Figure 1:
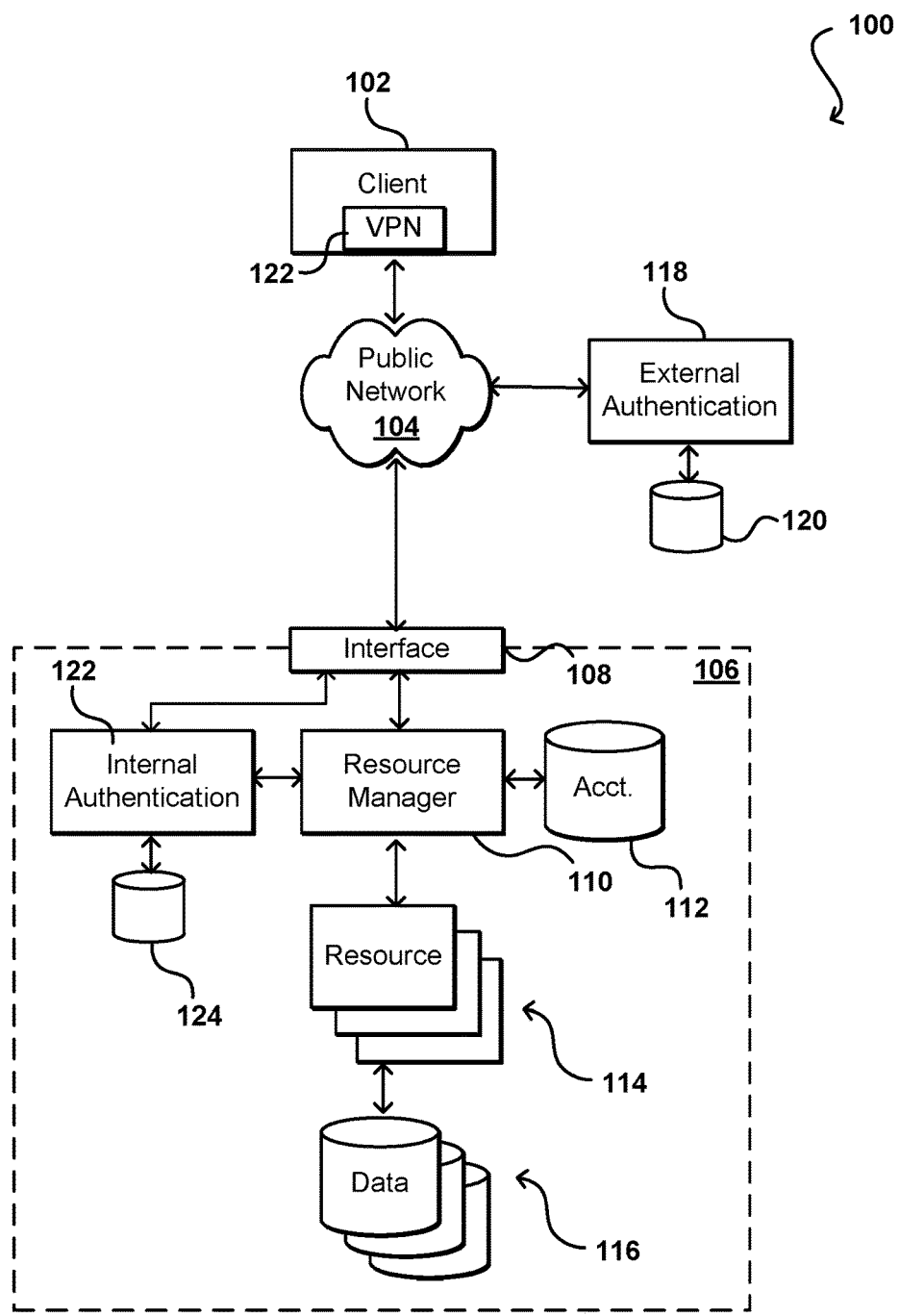
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to the device. Examples of such client devices include personal computers, tablet computers, smart phones, notebook computers, and the like. The network(s) 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. As illustrated, the components of the interface layer 108 can be internal or external to the provider environment 106, or a combination thereof. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an identity provider 118, a key management service, a corporate entity, a certificate authority, an identify broker such as a SAML provider, and the like. In some embodiments, a user can provide information useful in obtaining the credentials, such as user identity, account information, password, user-specific cryptographic key, customer number, and the like. The identity provider can provide the credentials to the resource provider environment 106 and/or to the client device 102, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors.

In some embodiments the resource manager can work with an authentication service (or other such system, device, component, or process) for authenticating a user request using the provided information and/or credentials. The authentication service can validate this information against information stored for the user. If the user has an account with the appropriate permissions, status, etc., and the provided information and credentials match those stored for the account, then the authentication service provide authentication of the request, such as by issuing a token or ticket that can be passed with requests for that user, device, or session to obtain access to various resources in the provider environment 106. The resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

In the case of a VPN request, the resource manager can allocate and configure a VPN connection such that VPN software 122 executing on the client device 102 can access the resources in the provider environment 106 as if the client were directly connected to those resources inside the provider environment. The token or ticket can be passed with requests on the VPN session in order to indicate authentication and obtain permitted access to the resources.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes. The same or a different authentication method may be used for other tasks, such as for the use of cryptographic keys. In some embodiments a key management system or service can be used to authenticate users and manage keys on behalf of those users. A key and/or certificate management service can maintain an inventory of all keys and certificates issued as well as the user to which they were issued.

The resource manager 110 (or another such system or service) in this example can also function as a virtual layer of hardware and software components that handles control functions in addition to management actions, as may include provisioning, scaling, replication, etc. The resource manager can utilize dedicated APIs provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of a pool of servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, when the client device gains access to the resources 114 and data stores 116 of the resource provider environment 106 through a VPN connection, the client device 102 can utilize internal machines, services, and websites, among other offerings, of the resource provider environment. This can include, for example, an employee accessing network resources of an employer from an offsite location through a public network, such as the Internet. The internal network and resources of the provider environment 106 will often be protected through physical security to prevent access to the resources 110 within the network. The environment may also be protected through software-based security to prevent external network traffic from reaching into the network, as well as preventing unauthenticated users from accessing private data stored in the environment 106. In order for the client device to access the network when the device cannot access physical network wiring or routers of the environment, the client device can establish a VPN to connect. Once authenticated with a VPN server, which can be the same as or separate from the resource manager and authentication service, the client device is permitted to make requests to internal network servers via a VPN tunnel established as part of the VPN session. Once on the network, however, the client device may still not be allowed access to most data without appropriate authentication. This can include identification of users as the users access data, for auditing and other purposes, as well as authorization of actions taken by those users on the various systems. In order to provide for such authentication, approaches in accordance with various embodiments can involve at least two separate authentication steps. These steps can include a first step to authenticate with the VPN server, in order to obtain a VPN connection. A second step involves a client device, having established a VPN connection, authenticating with an internal service. As mentioned, the authentication for internal services, as may provide websites or other content access, can involve an authentication mechanism that provides tokens that identifies the users associated with requests, where those tokens can only be obtained from a specific service, such as a corporate token granting service.

It might be the case that an attacker, such as a hacker or an automated process (i.e., a botnet) can obtain access to the provider network through a VPN connection, which by its nature is accessible on an open, public network such as the Internet. Once obtaining the connection, the attacker may degrade the experience provided to other, legitimate users within the network by repeatedly attempting to authenticate and obtain an authentication token. As mentioned, authentication can be a slow and non-performant operation. The services that perform the authentication and issue tokens typically do not require many machines backing the service, such that an attacker may be able to easily overwhelm the authentication service and prevent legitimate users of the network from authenticating and obtaining access to resources and content on the network.

Accordingly, approaches in accordance with various embodiments can attempt to minimize the ability of an attacker, or other malicious or unintended party, to overwhelm the authentication process or otherwise negatively impact the availability of various resources and services. In particular, approaches in accordance with various embodiments can provide an initial, lightweight authentication service that can act as a filter to prevent various invalid authentication requests from being received to an internal, or otherwise robust, authentication service. As illustrated in the example system 100 of FIG. 1, this can take the form of an external authentication system 118 or service that maintains a copy of relevant authentication information in a local data store 120. The offering can also include an internal authentication system 122 or service that has access to a complete and up-to-date set of authentication data stored in at least one relevant data repository 124 in the resource provider environment. The internal authentication service 122 can provide a full, robust authentication while the external authentication service 118 can provide a less robust authentication, or different type of authentication, in at least some embodiments. In some embodiments, the external authentication service 118 can utilize the internal data store, or at least an accessible portion of that data store, and in some embodiments can perform a full, robust authentication as well as discussed elsewhere herein.

In one embodiment, potential attack vectors can be altered by first causing authentication requests to be directed to the external authentication service 118, which can include any appropriate combination of hardware and software for performing authentication as discussed and suggested elsewhere herein. In some embodiments, the internal and external authentication services can communicate in order to attempt to synchronize the internal and external data stores 120, 124, although the external data store may only store a subset of the information in the internal data store, and may not include the most recent information obtained or modified since the last synchronization operation. This can be part of a VPN offering or other content or resource offering as discussed herein. When a request is received that is to be authenticated, that request (or information for the request) can first be directed to, or received by, the external authentication service 118. The external authentication service can perform a first authentication operation with respect to the request to determine whether the request cannot be authenticated. There can be various reasons why a given request cannot be authenticated, or can otherwise be denied by the external authentication service. As one example, a user or network address from which the request is received may be blacklisted, or indicated that access should not be granted. Similarly, the content or form of the request may not be correct, such that the request should be denied. Further, one or more aspects of the request might fall outside acceptable values or ranges. For example, the location or source of the request may be unexpected for the type of request, such as a request received from a country where no employees are located or from a competitor network. The request may also include credentials that are no longer valid, or are past a rotation time or valid state. The request may also specify an invalid username or device identifier, among other such options. In some embodiments the external authentication service can be provided with a set of rules or guidelines for determining whether to pass the information along to the internal authentication service 122 for a full authentication, or whether to deny the request and prevent the request from being delivered to the internal authentication service. The external authentication service 118 in some embodiments can thus act as a filter that can prevent certain types of invalid requests from being delivered to the internal authentication service. This can reduce the number of requests undergoing a robust and lengthy authentication process, which can help to reduce the chance of the internal authentication service being overwhelmed. Further, since the authentication process used by the external authentication service can be less robust, the overall resource capacity needed for request authentication can be significantly reduced, which can at least offset the additional complexity needed to offer the additional layer of authentication. It should also be noted that while the external authentication service 118 is illustrated as being outside the resource provider environment 106, in other embodiments the initial authentication can be performed by respective resources inside the resource provider environment, among other such options.

Figure 2A:
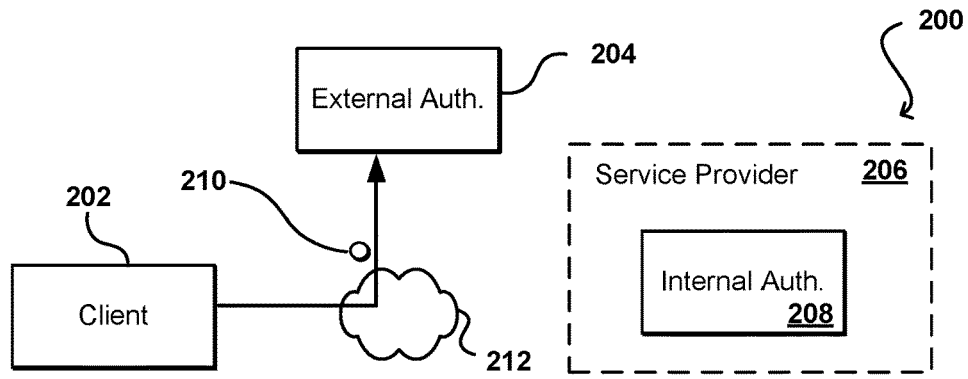
FIGS. 2A, 2B, and 2C illustrate an example approach wherein an external authentication can be performed before executing a more thorough internal authentication that can be utilized in accordance with various embodiments.
Figure 2B:
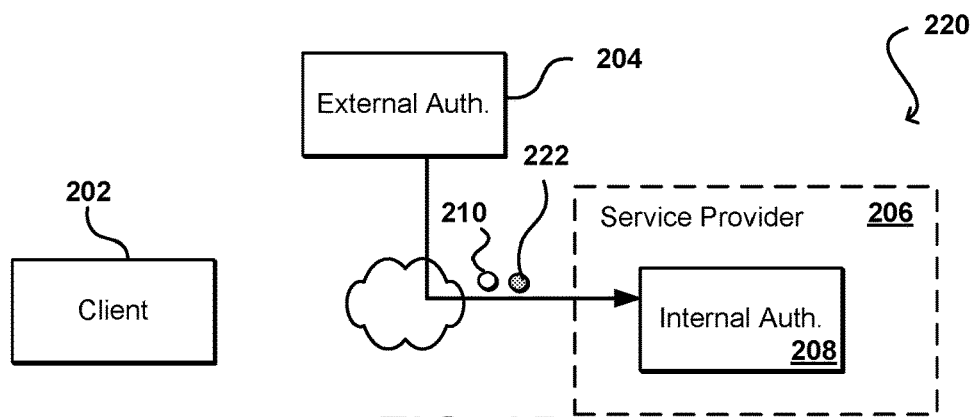
Figure 2C:
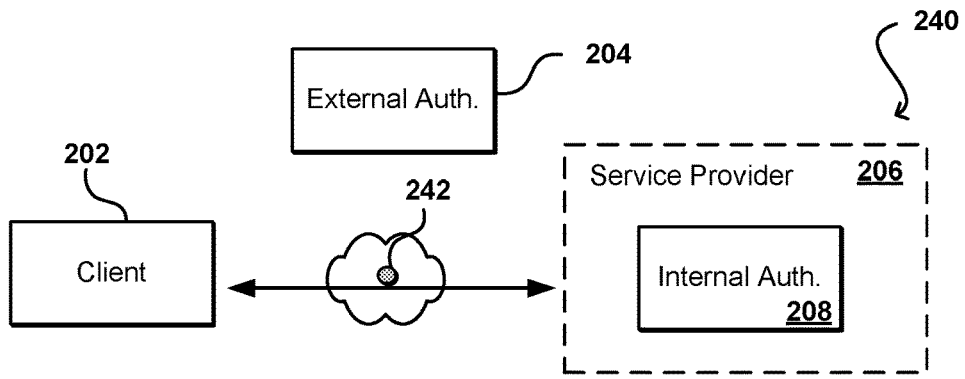

FIGS. 2A through 2C illustrate an example request flow through such a system that can be utilized in accordance with various embodiments. In the initial portion 200 of FIG. 2A, an authentication request (or other request requiring authentication) is transmitted by a client device 202 and received to an external authentication service 204. It should be noted that in some embodiments the request can be sent to an address associated with the external authentication service, or the request can be directed to the external authentication service. In other embodiments the request might be received to an interface layer of the target environment, and the relevant information for the authentication request can be directed to the external authentication service, among other such options. In this example, the request is at least partially transmitted using a public network 212, and includes at least one credential 210 (e.g., a password, token, or key) that can be used for authentication. In this example, the request is processed by the external authentication service 204 using the appropriate criteria and authentication information provided for the external authentication service. As mentioned, this can be part of a single authentication step or layer, or can involve a sequence of authentication layers, among other such options. If the request does not satisfy the authentication criteria, or satisfies at least one criterion for denying authentication as discussed herein, the request can be denied and neither the request nor information for the request passed to the internal authentication service 208. It should be noted that in at least some embodiments, information for a denied request may still be passed to the service provider environment 206 for logging, auditing, security, or other such purposes.

If the request is authenticated, or is otherwise not denied by the external authentication service, then the request (or information for the request) can be passed to the internal authentication service 208 as illustrated in the flow portion 220 of FIG. 2B. In this example, the information can include the credential 210 submitted with the original authentication request that can be used for authentication by the internal authentication service 208. In this example, the request information directed to the internal authentication service may also include a token 222, or other credential or identifier, indicating that the authentication request was received to, processed by, and authenticated by the external authentication service 204. This can enable the internal authentication service to ensure that any received authentication requests have been properly authenticated by the external authentication service 204, and quickly discard or deny any requests that have not already been authenticated by the external authentication service, such as where a malicious actor may have attempted to bypass the external authentication service. Thus, in some embodiments the internal authentication service can only process authentication requests that include a valid token 222 that would have been issued by the external authentication service 204. The internal authentication service 208 can then perform a full, robust authentication in some embodiments, as would otherwise have been performed in a system that did not utilize the external authentication service or additional authentication layer. In some embodiments, the internal authentication service 208 may use a slightly less robust authentication process since the presence of the authentication token 222 indicates that certain authentication checks have already been performed, and therefore do not need to be performed again for the specific request. If the request is authenticated by the internal authentication service, a response can be sent to the client device 202 indicating that access has been granted, which can enable the client device to communicate directly (over the public network, etc.) with the service provider environment 206 as illustrated in the flow portion 240 of FIG. 2C. In this example, an authentication token 242 may be provided to the client device that can be submitted with future requests or communications to the service provider environment, which can indicate that the requests correspond to an authenticated user or device. This can be the same token 222 that was issued by the external authentication service, although potentially updated, or a new token issued by the internal authentication service 208, among other such options. In some embodiments, the expiration, loss, or revoking of an authentication ticket or token 242 can cause a subsequent request from the user or client to be directed to the external authentication service 204 for re-authentication. In some embodiments, a recently-expired token or an explicit refreshing token can be used to re-authenticate. There can be at least two tokens in such, with one token being short-lived. Another token enable bypassing the at least the first set of checks. In some embodiments there can be a third token as well, such as an identification token, that outlives both the refreshing and authentication tokens but provides little but identification of the relevant user or device. In this case, the authentication provider can determine a reported identity via the token, but can utilize further checks to authenticate the user and trust that the claim in the identification token is valid.

As mentioned, there can be at least periodic synchronization of the authentication (and other related) data between the internal and external authentication systems. This can be performed hourly, daily, weekly, or at other intervals as appropriate or determined for the relevant embodiment. In some embodiments update times can include every specified number of authentication requests, at dynamic intervals based upon rate of change, at variable intervals determined upon a number of changes or updates in a most recent synchronization, or as a result of the authentication requests, such as to trigger a re-synchronization if the number of failed authentication requests increases significantly, such as maybe caused by a forced password change or other such occurrence. In some embodiments the data can also be updated for each update of the internal authentication data, among other such options. The external or first authentication layer or service can store less than a full set of data in at least some embodiments, such as to store records or types of data that are used for the lightweight authentication, without storing data relevant for only the internal or final authentication. As mentioned, data updates to the external authentication service can also be synchronized to the internal service in at least some embodiments. The data can include any appropriate information useful for authentication as discussed elsewhere herein, as may include usernames, user identifiers, permissions, roles, credentials, passwords, locations, IP address ranges, and the like. The information can also include Active Directories, as well as LDAP data, access lists, rules, or policies, among other such options. The external copy in some embodiments can be a clone of the true copy of the data stored by the internal authentication service.

In some embodiments, credentials such as an authentication token provided by, or on behalf of, a user or client device can demonstrate that the source of a request for access has been authenticated, and can be used to verify that the source of the request is authorized to obtain, directly or indirectly, that access. This can include, for example, a resource or component in the resource provider environment assuming a role of the user, or customer of the resource provider environment, in order to act on behalf of the user. This has the advantage to the user that a client or other component for the user can obtain access to the resources to obtain a series of tasks, without having to provide the credentials, or obtain new credentials, for every task. A potential downside, however, is that an unauthorized third party gaining access to, or a copy of, the credentials can also use them to assume the role of the user, and thus obtain similar access to the resources of the resource provider environment. It thus can be desirable in at least some situations to minimize the lifetime of these credentials in order to minimize the amount of "damage" that an unintended third party receiving the credentials can do under the assumed role or obtained access. The need to frequently obtain new credentials, however, undoes much of the benefit of the credentials having specified lifetimes in the first place, as the user would again have to frequently obtain new credentials, etc.

Figure 3:
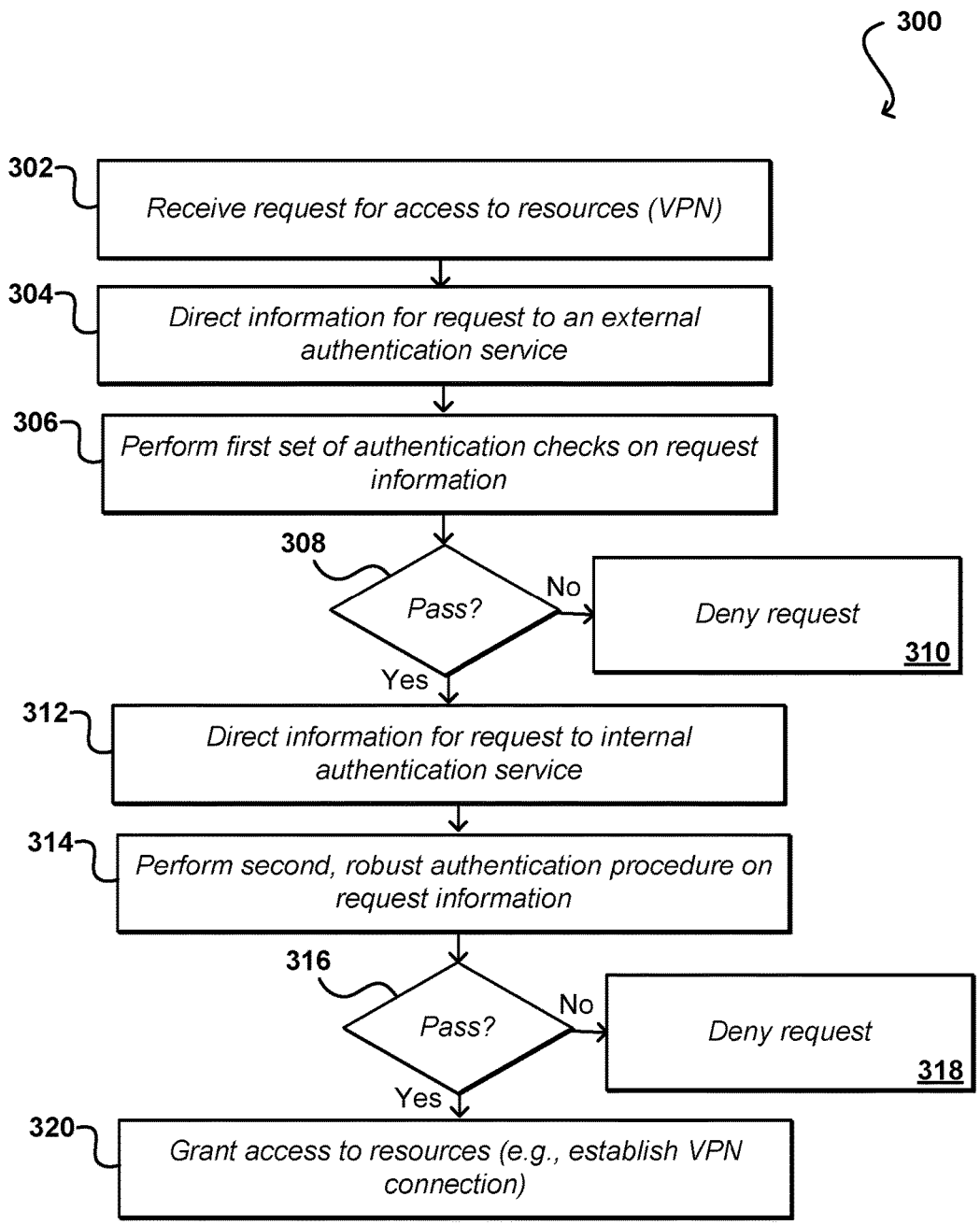
FIG. 3 illustrates an example process for filtering request using an external authentication layer that can be utilized in accordance with various embodiments.

FIG. 3 illustrates an example process 300 for authenticating a request that can be used in accordance with various embodiments. It should be understood that for this and other processes discussed herein that additional, fewer, or alternative steps can be performed in similar or alternative steps, or in parallel, within the scope of the various embodiments unless otherwise stated. In this example, a request for access to a set of resources is received 302. This can include any appropriate resources, such as servers or databases, as may be available as part of a VPN service or other such offering as discussed elsewhere herein. Information for the request can be directed 304 to an external authentication service. The request could have been received to an external service or a VPN service, for example, with the information being contained in the request, associated with a source of the request, or otherwise determined. In some embodiments, the request may include a credential or user identifier that can be used to obtain other authentication information relevant for the request. In this example process, a first set of authentication checks is performed 306 with respect to the request information. As mentioned, this can include a full authentication with a lower threshold for passing the checks, can include a subset of the authentication process, or can include a set of specified checks or filters that can be used to identify requests that will not be able to be authenticated and thus should not undergo a robust authentication via an internal authentication service or other such system. These checks can include, for example, the inclusion of valid credentials, acceptable source address, proper request format, valid username or identifier, and/or other such checks. A determination can be made 308 as to whether the information for the request passes these checks. If the request fails any of the checks in this example, the request can be denied 310. As mentioned, this has an advantage of having requests denied using a lightweight external service such that the invalid requests will not overwhelm a robust, internal authentication service in at least some embodiments.

If the information for the request is determined to pass all the initial authentication checks, the information for the request (either the same information already analyzed or other information, or a combination or derivation thereof) can be directed 312 to an internal authentication service, or other authentication service configured to perform a robust authentication with respect to the resources. As discussed herein, a "robust" authentication can refer to a full authentication process that relies upon current credentials and information to make a decision on whether to grant access to the resources. This is in contrast to a less robust, or less than full authentication that can be performed by the external authentication service in this example. The internal authentication service can use this (and potentially other) information to perform 314 a second, robust authentication procedure with respect to the request. This can correspond to a conventional authentication process in some embodiments, or can include a more intensive process since many of the invalid requests will already have been filtered out such that additional checks may be performed without overwhelming the system. In some embodiments, the second authentication procedure may not repeat at least some of the checks that were performed by the first set of authentication checks. If it is determined 316 that the request cannot be authenticated based on the information provided, the request can be denied. In some embodiments an authentication challenge can be posed to the user, for instance, such as to provide a short passcode sent via SMS to a registered phone or device, which could be considered a normal part of an example authentication flow. If, however, the request is able to be authenticated, then the access to the specified (or relevant) resources can be granted 320. This can include, for example, establishing a VPN connection with permissions to access various resources through the connection, among other such options. As mentioned, authentication can be based at least in part upon credentials received with the request, such as passwords, tokens, secure identifiers, and the like. The authentication can be based upon other criteria as well, such as the role or permissions of the user, the location of the user at the time of the request, the type of access requested, the resources targeted for the access, and others as discussed and suggested herein.

Figure 4:
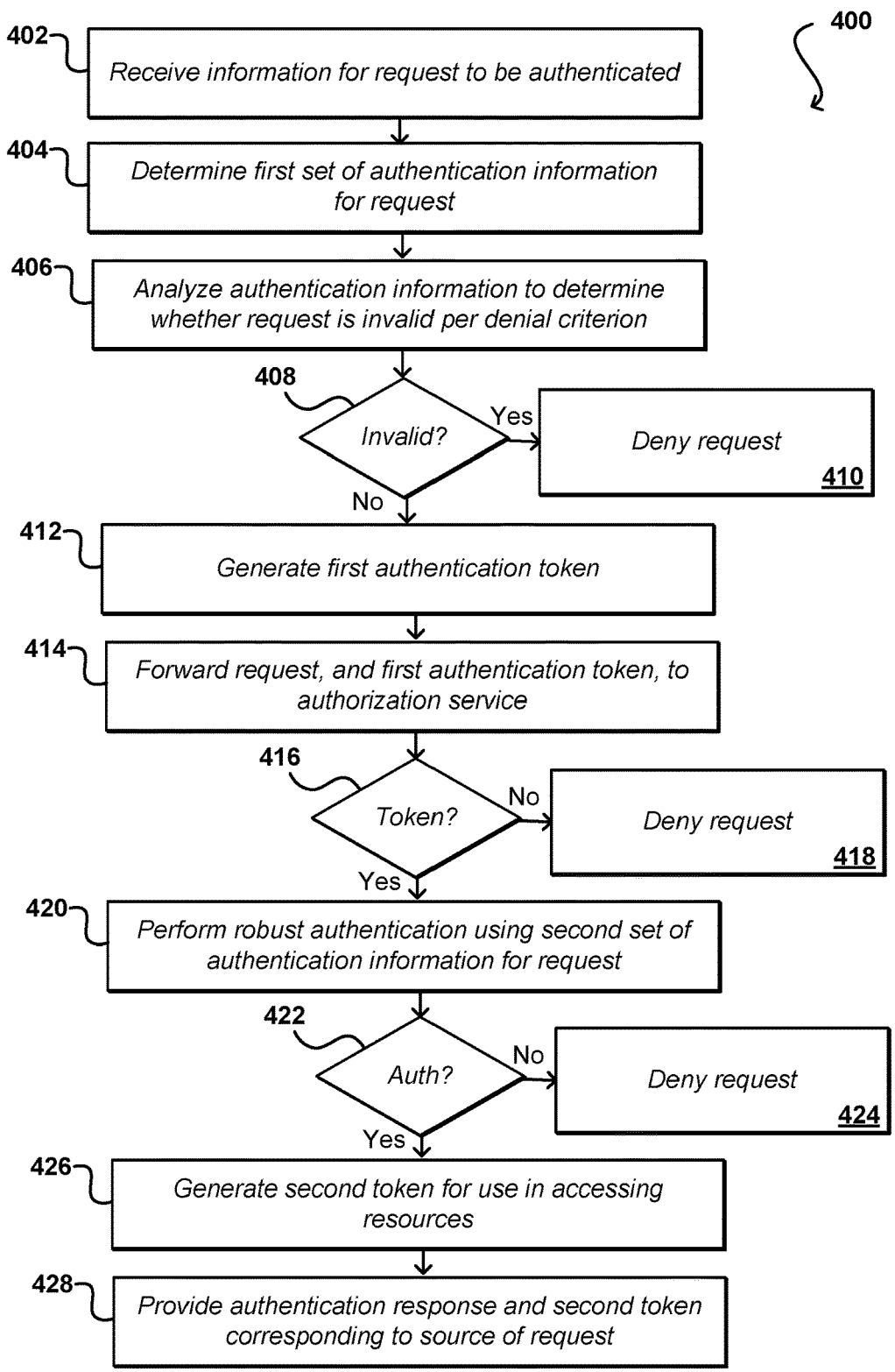
FIG. 4 illustrates an example process for authenticating a request for access that can be utilized in accordance with various embodiments.

FIG. 4 illustrates an example process 400 for managing a layered authentication that can be utilized in accordance with various embodiments. This can be used in place of, or along with, the process discussed with respect to FIG. 3. In this example, information is received 402 for a request that is to be authenticated. This can correspond to a request from a user, customer, or client device, or can be an automatically generated request corresponding to an action taken by one of those entities, among other such options. A first set of authentication information can be determined 404 for the request. This can include information, such as an access credential or user identifier, received with the request as well as other information, such as a user type or role information, stored for a particular user, among other types of information useful for such purposes. The authentication information can be analyzed 406 to determine whether the request is invalid (or at least unable to be authenticated) per at least one denial criterion. This can include a single step or a series of steps, where each step can function as an additional authentication layer that can be executed at the same or different locations using the same or separate systems or components. For example, an IP address range check may be performed initially before any analysis of a request or authentication information is performed. In some embodiments, each additional layer adds in complexity of processing, or utilizes more accurate authentication data, among other such options. For example, a first authentication layer can check the format of a password before passing the information to a password verification component. Various authentication criteria can be used for such purposes as discussed herein, as may relate to request source, user location, proper format, valid credential, active user account, and the like. Based at least in part upon any or all of these criteria, a determination can be made 408 whether the request is invalid, or at least unable to be authenticated. If so, the request can be denied 410 or other actions can be taken, such as to notify a user of an issue with the request that a valid user could remedy. If the request is not denied, or filtered out, using the denial criterion, which functions as a lightweight authentication mechanism in a first or initial layer, a first authentication token or ticket can be generated 412 in response to the request passing the lightweight authentication. The request, or information for the request, can be forwarded 414 along with the first authentication token to an authentication service, which can be an internal service in some embodiments that is responsible for performing a robust, or at least more thorough, authentication than that performed by the first layer. In some embodiments another action can be taken in place of providing an authentication token. For example, the request information can be encrypted using a specified key that indicates the information was encrypted by the first authentication provider. In some embodiments a private key from an asymmetric key pair, or a symmetric key generated during authentication and provided to the client, can also be used for verification of authentication by signing the request. The user would not need to provide the same bytes every time, but can encrypt the message or a hash of the message to prove the user has authenticated because a key is being used that was provided by the authentication mechanism. These can be time-based as well, such as by keeping track of when the corresponding public or symmetric key was generated.

The information for the request can be received to the authentication service, which can first determine 416 whether the first authentication token is present. If the system is configured such that any request for access (or otherwise requiring authentication) of a certain type will first pass through the first authentication process and receive an authentication token, then any request that is received by the authentication service without such a token can be denied 418 as being invalid for not having gone through the appropriate process. In some embodiments the request can be forwarded to the lightweight authentication process instead of a denial, such as where the request may have come through a channel that may not have correctly first directed the request to the first authentication layer, among other such options. If a valid authentication token is present, such as a token with a remaining valid lifetime having a proper format, or the information is encrypted using an authentication key, for example, then a robust authentication can be performed 420 using a second set of authentication information for the request. This can include the same set as the first set, a superset of the first set, a subset of the first set, or a set of information that includes at least some of the first set of authentication information that is appropriate for the robust authentication. Performing the same set of checks a second time can enable a provider to verify the authentication when the external authentication is provided by, for example, a third party provider, or where the information is transmitted over a public network, such that it may be desirable to perform the authentication checks a second time in a secure and trusted environment. Further, as discussed elsewhere herein the second authentication may require a user or client device to provide additional information to be used in the authentication process, as may involve providing specific information or answers to specific questions (e.g., security questions), among other such options. This can be useful for authentication procedures such as multi-factor authentication (MFA). As mentioned, the second authentication may correspond to a conventional authentication in at least some embodiments. If is determined 422 that the request is not authenticated, then the request can be denied 424 or otherwise processed. If the request is authenticated, a second token (or ticket, credential, etc.) can be generated 426 that can enable subsequent requests or actions for that user, device, or account to be granted without additional authentication, at least during a current session or active lifetime of the second token. An authentication response, as well as the second token, can then be provided 428 to a source of the request, or other destination, enabling the requested access to be obtained using the second credential.

Figure 5:
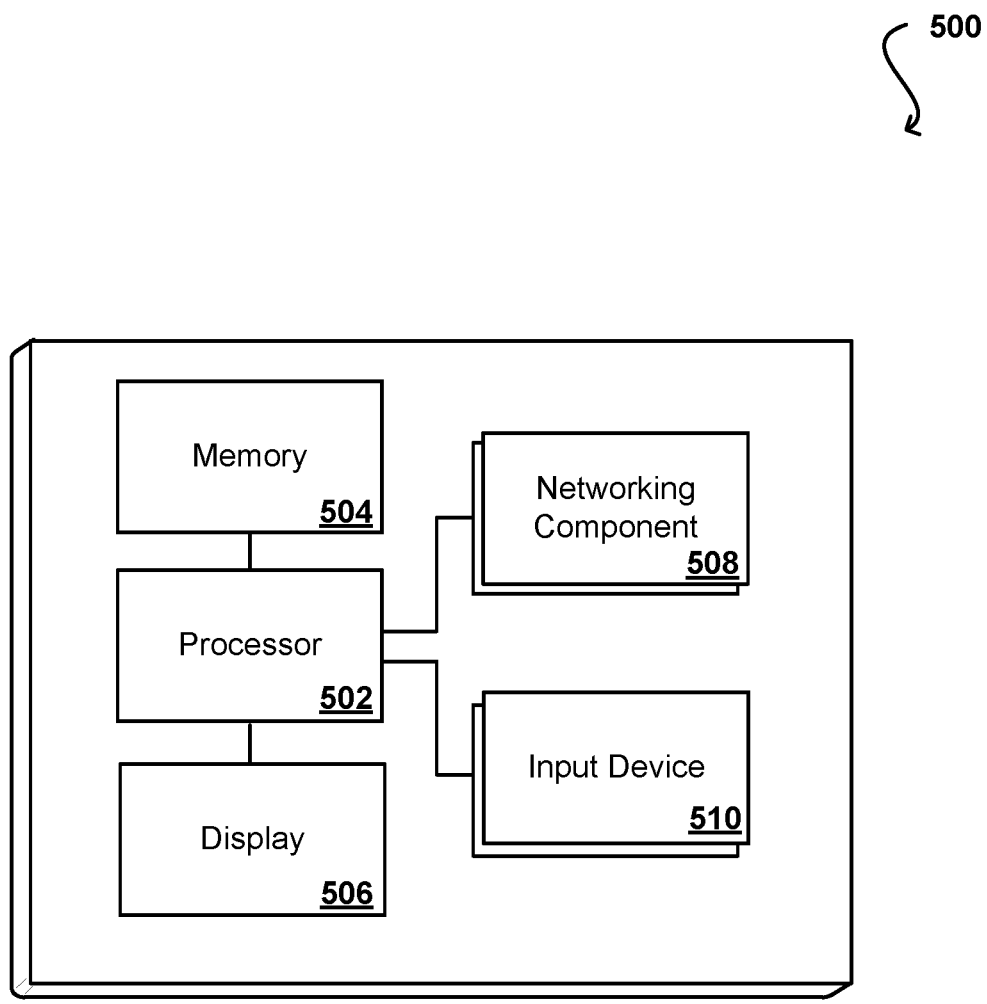
FIG. 5 illustrates example components of a computing device that can be used to implement aspects of various embodiments.

FIG. 5 illustrates a set of basic components of an example computing device 500 that can be utilized to implement aspects of the various embodiments. In this example, the device includes at least one processor 502 for executing instructions that can be stored in a memory device or element 504. As would be apparent to one of ordinary skill in the art, the device can include many types of memory, data storage or computer-readable media, such as a first data storage for program instructions for execution by the at least one processor 502, the same or separate storage can be used for images or data, a removable memory can be available for sharing information with other devices, and any number of communication approaches can be available for sharing with other devices. The device may include at least one type of display element 506, such as a touch screen, electronic ink (e-ink), organic light emitting diode (OLED) or liquid crystal display (LCD), although devices such as servers might convey information via other means, such as through a system of lights and data transmissions. The device typically will include one or more networking components 508, such as a port, network interface card, or wireless transceiver that enables communication over at least one network. The device can include at least one input device 510 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail.

Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving, at a virtual private network (VPN) server and from over a network, a request for access to one or more resources available through the VPN, the request including an access credential;
directing first information for the request to an external authentication service, the first information including the access credential;
determining that the first information satisfies a set of authentication criteria;
generating, via the external authentication service, an authentication token;
forwarding second information for the request to an internal authentication service, the second information including the access credential and the authentication token;
authenticating, via the internal authentication service, the request based upon the second information; and
granting the access to the one or more resources via a VPN connection, wherein requests failing to satisfy the set of authentication criteria are prevented from being received by the internal authentication service.

2. The computer-implemented method of claim 1, further comprising:
generating, in response to authenticating the request using the internal authentication service, a second authentication token to be provided to a source of the request for access, wherein subsequent access to the one or more resources is obtainable using the second authentication token without a second authentication by the internal authentication service.

3. The computer-implemented method of claim 1, further comprising:
receiving a subsequent request for access to the one or more resources;
determining, via the external authentication service, that the first information for the subsequent request fails to satisfy the set of authentication criteria; and
denying the subsequent request before any information for the subsequent request is received by the internal authentication service.

4. The computer-implemented method of claim 1, further comprising:
receiving second information for a subsequent request to the internal authentication service;
determining that the second information does not include the authentication token for the subsequent request; and
denying the subsequent request before performing an authentication for the subsequent request via the internal authentication service.

5. The computer-implemented method of claim 1, further comprising:
periodically synchronizing authentication data, stored by the internal authentication service, with a copy of the authentication data stored by the external authentication service and usable by the external authentication service to determine that the first information satisfies the set of authentication criteria.

6. A computer-implemented method, comprising:
receiving a first request and a second request for access to one or more resources in an electronic resource environment;
directing information for the first request and the second request to a first authentication system, the first authentication system configured to perform a first authentication check;
determining, via the first authentication system, that the information for the first request satisfies the first authentication check;
generating, via the first authentication system, an authentication token;

denying the second request, without forwarding the information for the second request to a second authentication system, in response to determining that the information for the second request fails the first authentication check;

forwarding the information for the first request to a second authentication system, the second authentication system configured to perform a second authentication check for the first request;

determining, via the second authentication system, that the information for the first request satisfies the second authentication check;

granting the access, corresponding to the first request, to the one or more resources.

7. The computer-implemented method of claim 6, further comprising:

receiving the request over a public network;

directing the information for the first request to the first authentication system, the first authentication system being external to the electronic resource environment; and forwarding the information for the first request to the second authentication system in response to the information for the request satisfying the first authentication check, the second authentication system comprising one or more resources inside the electronic resource environment.

8. The computer-implemented method of claim 6, further comprising:

forwarding the authentication token, with the information for the first request, to the second authentication system; and verifying that the authentication token is included with the information before performing an authentication process via the second authentication system.

9. The computer-implemented method of claim 6, further comprising:

generating, via the second authentication system and in response to determining that the information for the first request satisfies the second authentication check, an authentication token; and providing the authentication token to a source of the first request, wherein subsequent access to the one or more resources is available using the authentication token without a subsequent authentication via the second authentication system.

10. The computer-implemented method of claim 6, further comprising:

receiving the first request through a virtual private network (VPN) connection, wherein the second authentication system is performed by a VPN server in the electronic resource environment, and wherein the access is granted as if the source of the first request is directly connected to the electronic resource environment.

11. The computer-implemented method of claim 6, further comprising:

selecting the first authentication check, the first authentication check including at least one of a valid username, a valid user account, a valid request format, proper request content, an expected encryption key, an expected encryption algorithm, expected source address range, expected source geo-location, presence on a whitelist, or lack of presence on a blacklist of entities.

12. The computer-implemented method of claim 6, further comprising:

storing authentication data in the electronic resource environment for use with the second authentication system;

generating a copy of the authentication data outside the electronic resource environment for use with the first authentication system; and periodically updating the copy of the authentication data for use with the first authentication system, wherein the first authentication system is able to process the first authentication check using the copy of the authentication data.

13. The computer-implemented method of claim 6, further comprising:

utilizing at least a third authentication system before granting the access to the one or more resources.

14. The computer-implemented method of claim 6, further comprising:

providing the first authentication service with a set of policies for authenticating requests to be passed to the second authentication system.

15. A system, comprising:

at least one processor; and memory including instructions that, when executed by the at least one processor, cause the system to:

receive a first request and a second request for access to one or more resources in an electronic resource environment;

direct information for the first request and for the second request to a first authentication system, the first authentication system configured to perform a first authentication check;

determine, via the first authentication system, that the information for the first request satisfies the first authentication check;

generate, via the first authentication system, an authentication token;

deny the second request, without forwarding the information for the second request to a second authentication system, in response to determining that the information for the second request fails the first authentication check;

forward the information for the first request to a second authentication system, the second authentication system configured to perform a second authentication check with respect to the first request;

determine, via the second authentication system, that the information for the first request satisfies the second authentication check; and provide the access, corresponding to the first request, to the one or more resources.

16. The system of claim 15, wherein the instructions when executed further cause the system to:

receive the first request over a public network;

direct the information for the first request to the first authentication system, the first authentication system being external to the electronic resource environment; and forward the information for the first request to the second authentication system in response to the information for the first request satisfying the first authentication check, the second authentication system comprising one or more resources inside the electronic resource environment.

17. The system of claim 15, wherein the instructions when executed further cause the system to:

forward the authentication, with the information for the request, to the second authentication system; and verify that the authentication token is included with the information before performing the second authentication system.

18. The system of claim 15, wherein the instructions when executed further cause the system to:
   generate, via the second authentication system and in response to determining that the information for the first request satisfies the second authentication check, an authentication token; and
   provide the authentication token to a source of the first request, wherein subsequent access to the one or more resources is able to be obtained using the authentication token without a subsequent authentication via the second authentication system.

19. The system of claim 15, wherein the instructions when executed further cause the system to:
   store authentication data in the electronic resource environment for use with the second authentication system;
   generate a copy of the authentication data outside the electronic resource environment for use with the first authentication system; and
   periodically update the copy of the authentication data for use with the first authentication system, wherein the first authentication system is able to process the second authentication check using data only as current as a most recent synchronization.

20. The system of claim 15, wherein the instructions when executed further cause the system to:
   receive the first request through a virtual private network (VPN) connection, wherein the second authentication system is performed by a VPN server in the electronic resource environment, and wherein the access is granted as if the source of the request is directly connected to the electronic resource environment.

* * * * *